UNITED STATES PATENT OFFICE.

CONRAD F. STOLLMEYER, OF PORT-OF-SPAIN, TRINIDAD, WEST INDIES.

MANUFACTURE OF OILS FROM VEGETABLES, &c.

SPECIFICATION forming part of Letters Patent No. 271,664, dated February 6, 1883.

Application filed October 31, 1882. (No specimens.) Patented in Trinidad August 18, 1882.

*To all whom it may concern:*

Be it known that I, CONRAD F. STOLLMEYER, a citizen of the United States, residing at Port-of-Spain, in the Island of Trinidad, British West Indies, have invented a new and useful Improvement in the Manufacture of Oils from Vegetables, &c., which improvement is fully set forth in the following specification.

This invention consists in boiling vegetable and other substances of an oleaginous nature under a pressure greater than that of the atmosphere.

In carrying out my invention one of the modes that I have adopted is as follows: A steam-boiler, capable of resisting a pressure of one hundred and twenty pounds to the square inch, is filled with vegetables, nuts, or other substances of an oleaginous nature. Water is added to a convenient height and the boiling commenced. When the pressure has reached seventy-five pounds per square inch the fire is moderated, so as to keep the pressure as near as possible to that point, and the boiling is continued for about twelve hours. By this time all of the cells or parts of the substances are broken or disintegrated and the mass is reduced to a pulp, which mass is then run off into a tank where the free oil will rise to the top and the pulp settle to the bottom. The oil is then skimmed or otherwise removed, and the pulp placed in a press to have extracted from it whatever oil it contains. The oil, free and expressed, is filtered through pulverized charcoal, whereby it is cleared of impurities, and it will be found of a superior nature.

Among the advantages of treating the substances in the manner stated are, that all of the oil-holding cells of the substances are fully opened, and the oil is thereby entirely liberated, expensive crushing machinery is avoided, and the resultant oil-cake, owing to the thorough boiling of the substances, produces a most digestible food for cattle.

Having thus described my invention, what I claim as new, and desire to secure by Letters Patent, is—

1. The process of manufacturing vegetable oil, consisting in boiling vegetable and other substances of an oleaginous nature under a pressure greater than that of the atmosphere, substantially as described.

2. The process of manufacturing vegetable oil, consisting in boiling vegetable and other substances of an oleaginous nature under a pressure greater than that of the atmosphere, and filtering the resultant oil through charcoal, substantially as set forth.

CONRAD F. STOLLMEYER.

Witnesses:
   ANDREW HAMILTON,
     *Sec. U. S. Consul, Trinidad, B. W. I.*
   EUGENE PRAULSANDT.